J. Sennett.

Heddle for Loom.

No. 102. A I. Patented Jul. 20, 1852.

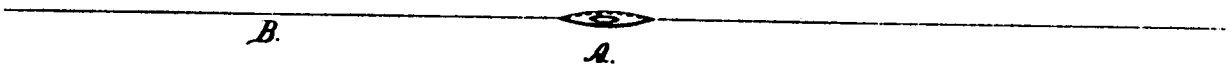

No. 102.—*Improvement in Heddles of Weaver's Harness.*

Having thus described my improvement, what I claim as my invention, and desire to have added to my patent, is casting eyes of harness, or heddles, upon single or multiplied strands of worsted, silk, cotton, thread, or other material, in the manner and for the purpose herein set forth.

DEPARTMENT OF COMMERCE
UNITED STATES PATENT AND TRADEMARK OFFICE

---

MISSING PAGE(S)

PATENT NUMBER AI 102 FOR THE ISSUE DATE 07/20/1852 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text